(12) United States Patent
Usoro et al.

(10) Patent No.: US 7,261,666 B2
(45) Date of Patent: Aug. 28, 2007

(54) MULTI-SPEED PLANETARY TRANSMISSIONS HAVING SEVEN TORQUE TRANSMITTING DEVICES ENGAGED IN COMBINATIONS OF FIVE

(75) Inventors: Patrick B. Usoro, Troy, MI (US); Madhusudan Raghavan, West Bloomfield, MI (US); Norman K. Bucknor, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 237 days.

(21) Appl. No.: 11/177,902

(22) Filed: Jul. 8, 2005

(65) Prior Publication Data
US 2007/0010368 A1 Jan. 11, 2007

(51) Int. Cl.
*F16H 3/62* (2006.01)
(52) U.S. Cl. ............................................. 475/275
(58) Field of Classification Search ......... 475/275–279
See application file for complete search history.

(56) References Cited

U.S. PATENT DOCUMENTS

| | | | |
|---|---|---|---|
| 4,070,927 A | 1/1978 | Polak | 475/286 |
| 4,709,594 A | 12/1987 | Maeda | 475/280 |
| 5,106,352 A | 4/1992 | Lepelletier | 475/280 |
| 5,385,064 A | 1/1995 | Reece | 74/331 |
| 5,497,867 A | 3/1996 | Hirsch et al. | 192/48.91 |
| 5,560,461 A | 10/1996 | Loeffler | 192/53.32 |
| 5,599,251 A | 2/1997 | Beim et al. | 475/275 |
| 5,641,045 A | 6/1997 | Ogawa et al. | 192/53.341 |
| 5,651,435 A | 7/1997 | Perosky et al. | 192/219 |
| 5,975,263 A | 11/1999 | Forsyth | 192/53.32 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,354,416 B1 | 3/2002 | Eo | 192/53.341 |
| 6,375,592 B1 | 4/2002 | Takahashi et al. | 475/262 |
| 6,422,969 B1 | 7/2002 | Raghavan et al. | 475/276 |
| 6,425,841 B1 | 7/2002 | Haka | 475/275 |
| 6,471,615 B1 | 10/2002 | Naraki et al. | 475/262 |
| 6,558,287 B2 | 5/2003 | Hayabuchi et al. | 475/271 |
| 6,623,397 B1 | 9/2003 | Raghavan et al. | 360/96.5 |
| 6,840,885 B2 | 1/2005 | Yi et al. | 475/276 |
| 7,081,066 B2* | 7/2006 | Raghavan et al. | 475/317 |
| 7,104,916 B2* | 9/2006 | Usoro et al. | 475/296 |
| 7,192,378 B2* | 3/2007 | Raghavan et al. | 475/276 |
| 2006/0040784 A1* | 2/2006 | Usoro et al. | 475/275 |

FOREIGN PATENT DOCUMENTS

JP 09-126283 5/1997

* cited by examiner

*Primary Examiner*—Ha Ho

(57) ABSTRACT

The family of transmissions has a plurality of members that can be utilized in powertrains to provide at least eight forward speed ratios and one reverse speed ratio. The transmission family members include three planetary gear sets having seven torque-transmitting mechanisms and one interconnecting member. The powertrain includes an engine that is selectively connectable to at least one of the planetary gear members and an output member that is continuously connected with another one of the planetary gear members. The seven torque-transmitting mechanisms provide interconnections between various gear members, the input shaft and the transmission housing, and are operated in combinations of five to establish at least eight forward speed ratios and at least one reverse speed ratio.

18 Claims, 12 Drawing Sheets

| | RATIOS | 50 | 52 | 54 | 56 | 57 | 58 | 59 |
|---|---|---|---|---|---|---|---|---|
| REVERSE | -2.93 | | X | | X | X | X | X |
| NEUTRAL | 0.00 | | X | | | X | X | X |
| 1 | 5.41 | X | X | | | X | X | X |
| 2 | 3.08 | X | | X | | X | X | X |
| 3 | 1.81 | | X | X | X | X | | X |
| 4 | 1.21 | X | | X | X | X | | X |
| 5 | 1.00 | X | X | X | X | | X | |
| 6 | 0.82 | | X | X | X | | X | X |
| 7 | 0.55 | X | | X | X | | X | X |
| 8 | 0.50 | X | X | | X | | X | X |

(X = ENGAGED CLUTCH)

$\dfrac{\text{RING GEAR}}{\text{SUN GEAR}}$ TOOTH RATIO: $\dfrac{N_{R1}}{N_{S1}} = 1.50$, $\dfrac{N_{R2}}{N_{S2}} = 2.09$, $\dfrac{N_{R3}}{N_{S3}} = 2.93$

| RATIO SPREAD | 10.82 |
|---|---|
| RATIO STEPS | |
| REV/1 | -0.54 |
| 1/2 | 1.76 |
| 2/3 | 1.70 |
| 3/4 | 1.50 |
| 4/5 | 1.21 |
| 5/6 | 1.22 |
| 6/7 | 1.49 |
| 7/8 | 1.10 |

| | RATIOS | 150 | 152 | 154 | 156 | 157 | 158 | 159 |
|---|---|---|---|---|---|---|---|---|
| REVERSE | -2.22 | | X | X | X | | X | X |
| NEUTRAL | 0.00 | | X | | X | | X | X |
| 1 | 4.32 | X | X | | X | | X | X |
| 2 | 2.67 | X | | | X | X | X | X |
| 3 | 1.82 | X | X | | X | X | | X |
| 4 | 1.25 | X | | X | X | X | | X |
| 5 | 1.00 | X | X | X | | X | X | |
| 6 | 0.77 | | X | X | X | X | X | |
| 7 | 0.64 | X | | X | X | X | X | |
| 8 | 0.48 | X | X | X | X | | X | |

(X = ENGAGED CLUTCH)

$\frac{\text{RING GEAR}}{\text{SUN GEAR}}$ TOOTH RATIO: $\frac{N_{R1}}{N_{S1}} = 2.22$, $\frac{N_{R2}}{N_{S2}} = 1.50$, $\frac{N_{R3}}{N_{S3}} = 2.22$

| RATIO SPREAD | 9.00 |
|---|---|
| RATIO STEPS | |
| REV/1 | -0.51 |
| 1/2 | 1.62 |
| 2/3 | 1.47 |
| 3/4 | 1.46 |
| 4/5 | 1.25 |
| 5/6 | 1.30 |
| 6/7 | 1.20 |
| 7/8 | 1.33 |

| | RATIOS | 250 | 252 | 254 | 256 | 257 | 258 | 259 |
|---|---|---|---|---|---|---|---|---|
| REVERSE | -3.79 | X | | | X | X | X | X |
| NEUTRAL | 0.00 | X | | | X | | X | X |
| 1 | 4.79 | X | | X | X | | X | X |
| 2 | 2.98 | X | | X | | X | X | X |
| 3 | 1.79 | | X | X | | X | X | X |
| 4 | 1.36 | X | X | | | X | X | X |
| 5 | 1.00 | X | X | X | X | X | | |
| 6 | 0.60 | | X | X | X | X | | X |
| 7 | 0.54 | X | X | | X | X | | X |
| 8 | 0.42 | X | X | X | X | | | X |

(X = ENGAGED CLUTCH)

$\underline{\text{RING GEAR}}$ TOOTH RATIO: $\frac{N_{R1}}{N_{S1}} = 1.52$, $\frac{N_{R2}}{N_{S2}} = 1.51$, $\frac{N_{R3}}{N_{S3}} = 1.50$
SUN GEAR

| RATIO SPREAD | 11.40 |
|---|---|
| RATIO STEPS | |
| REV/1 | -0.79 |
| 1/2 | 1.61 |
| 2/3 | 1.66 |
| 3/4 | 1.32 |
| 4/5 | 1.36 |
| 5/6 | 1.67 |
| 6/7 | 1.11 |
| 7/8 | 1.29 |

| RATIOS | | 350 | 352 | 354 | 356 | 357 | 358 | 359 |
|---|---|---|---|---|---|---|---|---|
| REVERSE | -3.79 | | X | X | | X | X | X |
| NEUTRAL | 0.00 | | X | X | | X | X | |
| 1 | 4.73 | | X | X | X | X | X | |
| 2 | 2.96 | | X | X | X | X | | X |
| 3 | 1.78 | X | | X | X | X | | X |
| 4 | 1.36 | X | X | X | | X | | X |
| 5 | 1.00 | X | X | X | | X | X | |
| 6 | 0.80 | X | X | | X | X | X | |
| 7 | 0.72 | X | X | | | X | X | X |
| 8 | 0.60 | X | X | | X | | X | X |

(X = ENGAGED CLUTCH)

$\dfrac{\text{RING GEAR}}{\text{SUN GEAR}}$ TOOTH RATIO: $\dfrac{N_{R1}}{N_{S1}} = 1.51$, $\dfrac{N_{R2}}{N_{S2}} = 1.52$, $\dfrac{N_{R3}}{N_{S3}} = 1.50$

| RATIO SPREAD | 7.88 |
|---|---|
| RATIO STEPS | |
| REV/1 | -0.80 |
| 1/2 | 1.60 |
| 2/3 | 1.66 |
| 3/4 | 1.31 |
| 4/5 | 1.36 |
| 5/6 | 1.25 |
| 6/7 | 1.11 |
| 7/8 | 1.20 |

| RATIOS | | 450 | 452 | 454 | 456 | 457 | 458 | 459 |
|---|---|---|---|---|---|---|---|---|
| REVERSE | -3.80 | | X | | X | X | X | X |
| NEUTRAL | 0.00 | | X | | X | X | | X |
| 1 | 4.82 | | X | X | X | X | | X |
| 2 | 2.99 | | X | X | X | | X | X |
| 3 | 1.80 | X | | X | X | X | | X |
| 4 | 1.37 | X | X | | X | | X | X |
| 5 | 1.00 | X | X | X | | X | X | |
| 6 | 0.80 | X | X | X | | X | | X |
| 7 | 0.71 | X | X | | | X | X | X |
| 8 | 0.60 | X | | X | | X | X | X |

(X = ENGAGED CLUTCH)

RING GEAR / SUN GEAR TOOTH RATIO: $\frac{N_{R1}}{N_{S1}} = 1.50$, $\frac{N_{R2}}{N_{S2}} = 1.65$, $\frac{N_{R3}}{N_{S3}} = 1.50$

| RATIO SPREAD | 8.03 |
|---|---|
| RATIO STEPS | |
| REV/1 | -0.79 |
| 1/2 | 1.61 |
| 2/3 | 1.66 |
| 3/4 | 1.31 |
| 4/5 | 1.37 |
| 5/6 | 1.25 |
| 6/7 | 1.13 |
| 7/8 | 1.18 |

| | RATIOS | 550 | 552 | 554 | 556 | 557 | 558 | 559 |
|---|---|---|---|---|---|---|---|---|
| REVERSE | -8.09 | | X | | X | X | X | |
| NEUTRAL | 0.00 | | X | | X | X | X | |
| 1 | 9.93 | | X | | X | X | X | X |
| 2 | 5.96 | X | | | X | X | X | X |
| 3 | 4.00 | X | X | | X | X | | X |
| 4 | 2.68 | X | | X | | X | X | X |
| 5 | 1.81 | | X | X | X | | X | X |
| 6 | 1.43 | X | X | X | | X | | X |
| 7 | 1.09 | X | | X | X | X | | X |
| 8 | 1.00 | X | X | X | X | | | X |

(X = ENGAGED CLUTCH)

$\dfrac{\text{RING GEAR}}{\text{SUN GEAR}}$ TOOTH RATIO: $\dfrac{N_{R1}}{N_{S1}} = 3.00$, $\dfrac{N_{R2}}{N_{S2}} = 2.02$, $\dfrac{N_{R3}}{N_{S3}} = 1.50$

| RATIO SPREAD | 9.93 |
|---|---|
| RATIO STEPS | |
| REV/1 | -0.81 |
| 1/2 | 1.67 |
| 2/3 | 1.49 |
| 3/4 | 1.49 |
| 4/5 | 1.48 |
| 5/6 | 1.27 |
| 6/7 | 1.43 |
| 7/8 | 1.10 |

| RATIOS | | 650 | 652 | 654 | 656 | 657 | 658 | 659 |
|---|---|---|---|---|---|---|---|---|
| REVERSE | -8.24 | X | X | | | X | X | X |
| NEUTRAL | 0.00 | X | | | | X | X | X |
| 1 | 4.46 | X | | | X | X | X | X |
| 2 | 3.07 | | X | | X | X | X | X |
| 3 | 2.13 | X | | X | | X | X | X |
| 4 | 1.45 | X | | X | X | | X | X |
| 5 | 1.00 | X | X | X | X | X | | |
| 6 | 0.68 | X | X | X | X | | | X |
| 7 | 0.56 | X | X | X | | X | | X |
| 8 | 0.40 | | X | X | X | X | | X |

(X = ENGAGED CLUTCH)

$\frac{\text{RING GEAR}}{\text{SUN GEAR}}$ TOOTH RATIO: $\frac{N_{R1}}{N_{S1}} = 1.96$, $\frac{N_{R2}}{N_{S2}} = 2.02$, $\frac{N_{R3}}{N_{S3}} = 2.22$

| RATIO SPREAD | 11.15 |
|---|---|
| RATIO STEPS | |
| REV/1 | -1.85 |
| 1/2 | 1.45 |
| 2/3 | 1.44 |
| 3/4 | 1.47 |
| 4/5 | 1.45 |
| 5/6 | 1.47 |
| 6/7 | 1.21 |
| 7/8 | 1.40 |

| | RATIOS | 750 | 752 | 754 | 756 | 757 | 758 | 759 |
|---|---|---|---|---|---|---|---|---|
| REVERSE | -2.22 | | X | | X | X | X | X |
| NEUTRAL | 0.00 | | | | X | X | X | X |
| 1 | 4.91 | X | | | X | X | X | X |
| 2 | 3.47 | | X | X | X | | X | X |
| 3 | 2.37 | X | X | | X | | X | X |
| 4 | 1.77 | X | | X | X | | X | |
| 5 | 1.28 | | X | X | X | X | X | |
| 6 | 1.00 | X | X | X | | X | X | |
| 7 | 0.65 | X | | X | X | X | X | |
| 8 | 0.51 | X | X | X | X | X | | |

(X = ENGAGED CLUTCH)

$\dfrac{\text{RING GEAR}}{\text{SUN GEAR}}$ TOOTH RATIO: $\dfrac{N_{R1}}{N_{S1}} = 2.22$, $\dfrac{N_{R2}}{N_{S2}} = 1.51$, $\dfrac{N_{R3}}{N_{S3}} = 2.22$

| RATIO SPREAD | 9.63 |
|---|---|
| RATIO STEPS | |
| REV/1 | -0.45 |
| 1/2 | 1.41 |
| 2/3 | 1.46 |
| 3/4 | 1.34 |
| 4/5 | 1.38 |
| 5/6 | 1.28 |
| 6/7 | 1.54 |
| 7/8 | 1.27 |

| | RATIOS | 850 | 852 | 854 | 856 | 857 | 858 | 859 |
|---|---|---|---|---|---|---|---|---|
| REVERSE | -2.22 | | X | | X | X | X | X |
| NEUTRAL | 0.00 | | | | X | X | X | X |
| 1 | 4.91 | X | | | X | X | X | X |
| 2 | 3.47 | | X | X | X | X | X | |
| 3 | 2.37 | X | X | | X | X | X | |
| 4 | 1.76 | X | | X | X | X | X | |
| 5 | 1.28 | | X | X | X | X | | X |
| 6 | 1.00 | X | X | X | | X | X | |
| 7 | 0.65 | X | | X | X | X | | X |
| 8 | 0.51 | X | X | X | X | | | X |

(X = ENGAGED CLUTCH)

$\dfrac{\text{RING GEAR}}{\text{SUN GEAR}}$ TOOTH RATIO: $\dfrac{N_{R_1}}{N_{S_1}} = 1.51$, $\dfrac{N_{R_2}}{N_{S_2}} = 2.22$, $\dfrac{N_{R_3}}{N_{S_3}} = 2.22$

| RATIO SPREAD | 9.63 |
|---|---|
| RATIO STEPS | |
| REV/1 | -0.45 |
| 1/2 | 1.41 |
| 2/3 | 1.46 |
| 3/4 | 1.35 |
| 4/5 | 1.38 |
| 5/6 | 1.28 |
| 6/7 | 1.54 |
| 7/8 | 1.27 |

| | RATIOS | 950 | 952 | 954 | 956 | 957 | 958 | 959 |
|---|---|---|---|---|---|---|---|---|
| REVERSE | -1.97 | X | | X | X | | X | X |
| NEUTRAL | 0.00 | X | | | X | | X | X |
| 1 | 4.74 | X | | | X | X | X | |
| 2 | 2.26 | | X | | X | X | X | |
| 3 | 1.61 | X | | X | | | X | |
| 4 | 1.20 | | X | X | | | X | X |
| 5 | 1.00 | X | X | X | | X | X | |
| 6 | 0.75 | | X | X | X | X | | X |
| 7 | 0.67 | X | X | X | X | | | X |
| 8 | 0.58 | X | X | | X | X | | X |

(X = ENGAGED CLUTCH)

$\dfrac{\text{RING GEAR}}{\text{SUN GEAR}}$ TOOTH RATIO: $\dfrac{N_{R1}}{N_{S1}} = 2.28$, $\dfrac{N_{R2}}{N_{S2}} = 1.97$, $\dfrac{N_{R3}}{N_{S3}} = 2.99$

| RATIO SPREAD | 8.17 |
|---|---|
| RATIO STEPS | |
| REV/1 | -0.42 |
| 1/2 | 2.10 |
| 2/3 | 1.40 |
| 3/4 | 1.34 |
| 4/5 | 1.20 |
| 5/6 | 1.33 |
| 6/7 | 1.12 |
| 7/8 | 1.16 |

| | RATIOS | 1050 | 1052 | 1054 | 1056 | 1057 | 1058 | 1059 |
|---|---|---|---|---|---|---|---|---|
| REVERSE | -8.08 | | X | X | X | | X | X |
| NEUTRAL | 0.00 | | X | | X | X | | X |
| 1 | 9.62 | | X | | X | X | X | X |
| 2 | 5.79 | X | | | X | X | X | X |
| 3 | 3.92 | X | X | | | X | X | X |
| 4 | 2.64 | X | | X | | X | X | X |
| 5 | 1.81 | | X | X | X | X | | X |
| 6 | 1.42 | X | X | X | | X | | X |
| 7 | 1.09 | X | | X | X | X | | X |
| 8 | 1.00 | X | X | X | X | X | | |

(X = ENGAGED CLUTCH)

$\frac{\text{RING GEAR}}{\text{SUN GEAR}}$ TOOTH RATIO: $\frac{N_{R1}}{N_{S1}} = 2.92$, $\frac{N_{R2}}{N_{S2}} = 2.06$, $\frac{N_{R3}}{N_{S3}} = 1.51$

| RATIO SPREAD | 9.62 |
|---|---|
| RATIO STEPS | |
| REV/1 | -0.84 |
| 1/2 | 1.66 |
| 2/3 | 1.48 |
| 3/4 | 1.48 |
| 4/5 | 1.46 |
| 5/6 | 1.27 |
| 6/7 | 1.30 |
| 7/8 | 1.09 |

| | RATIOS | 1150 | 1152 | 1154 | 1156 | 1157 | 1158 | 1159 |
|---|---|---|---|---|---|---|---|---|
| REVERSE | -4.79 | | X | X | X | X | | X |
| NEUTRAL | 0.00 | | X | X | X | X | | |
| 1 | 10.69 | | X | X | X | X | X | |
| 2 | 5.33 | | X | X | | X | X | X |
| 3 | 2.67 | X | | X | X | X | X | |
| 4 | 1.85 | X | X | X | X | | | X |
| 5 | 1.52 | X | X | X | X | | X | |
| 6 | 1.33 | X | X | | | X | X | X |
| 7 | 1.00 | X | X | X | X | X | | |
| 8 | 0.73 | X | X | X | | X | | X |

(X = ENGAGED CLUTCH)

$\dfrac{\text{RING GEAR}}{\text{SUN GEAR}}$ TOOTH RATIO: $\dfrac{N_{R1}}{N_{S1}} = 2.50$, $\dfrac{N_{R2}}{N_{S2}} = 3.00$, $\dfrac{N_{R3}}{N_{S3}} = 3.00$

| RATIO SPREAD | 14.64 |
|---|---|
| RATIO STEPS | |
| REV/1 | -0.45 |
| 1/2 | 2.01 |
| 2/3 | 2.00 |
| 3/4 | 1.44 |
| 4/5 | 1.22 |
| 5/6 | 1.14 |
| 6/7 | 1.33 |
| 7/8 | 1.37 |

MULTI-SPEED PLANETARY TRANSMISSIONS HAVING SEVEN TORQUE TRANSMITTING DEVICES ENGAGED IN COMBINATIONS OF FIVE

TECHNICAL FIELD

The present invention relates to a family of power transmissions having three planetary gear sets that are controlled by seven torque-transmitting devices to provide at least eight forward speed ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved family of transmissions having three planetary gear sets controlled to provide at least eight forward speed ratios and at least one reverse speed ratio.

In one aspect of the present invention, the family of transmissions has three planetary gear sets, each of which includes a first, second and third member, which members may comprise a sun gear, a ring gear, a planet carrier assembly member, or a pinion, in any order.

In referring to the first, second and third gear sets in this description and in the claims, these sets may be counted "first" to "third" in any order in the drawings (i.e., left to right, right to left, etc.).

In another aspect of the present invention, the planetary gear sets may be of the single pinion-type or of the double pinion-type.

In yet another aspect of the present invention, a first member of the first planetary gear set is continuously interconnected with a first member of the second planetary gear set or with a stationary member.

The interconnecting members may be multi-piece rigid connections, single piece rigid connections, shared ring gears, shared carriers, shared sun gears, long pinions, such as in a Ravigneax gear set, or other suitable devices.

In yet a further aspect of the invention, each family member incorporates an output shaft which is continuously connected with at least one member of the planetary gear sets, and an input shaft which is not continuously connected with any member of the planetary gear sets but is selectively connectable with at least one member of the planetary gear sets through at least one of seven torque-transmitting mechanisms (torque transfer devices).

In still a further aspect of the invention, a first torque-transmitting mechanism, such as a clutch, selectively interconnects a member of the first, second or third planetary gear set with the input shaft.

In another aspect of the invention, a second torque-transmitting mechanism, such as a clutch, selectively interconnects another member of the first, second or third planetary gear set with the input shaft.

In a still further aspect of the invention, a third torque-transmitting mechanism, such as a clutch, selectively interconnects a member of the first planetary gear set with a member of the second or third planetary gear set.

In a still further aspect of the invention, a fourth torque-transmitting mechanism, such as a clutch, selectively interconnects a member of the second planetary gear set with a member of the first or third planetary gear set.

In a still further aspect of the invention, a fifth torque-transmitting mechanism, such as a clutch, selectively connects a member of the third planetary gear set with a member of the first or third planetary gear set.

In still another aspect of the invention, a sixth torque-transmitting mechanism, such as a clutch, selectively connects a member of the first or third planetary gear set with another member of the first, second or third planetary gear set. Alternatively, a sixth torque-transmitting mechanism, such as a brake, selectively connects a member of the first or third planetary gear set with the stationary member (ground/transmission case).

In still another aspect of the invention, a seventh torque-transmitting mechanism, such as a clutch, selectively interconnects a member of the first, second or third planetary gear set with another member of the first, second or third planetary gear set. Alternatively, the seventh torque-transmitting mechanism, such as a brake, selectively connects a member of the first, second or third planetary gear set with the stationary member (ground/transmission case).

In still another aspect of the invention, the seven torque-transmitting mechanisms are selectively engageable in combinations of five to yield at least eight forward speed ratios and at least one reverse speed ratio.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention;

FIG. 9b is a truth table and chart depicting some of the operating characteristics of the powertrain shown in FIG. 9a;

FIG. 10a is a schematic representation of a powertrain having a planetary transmission incorporating another family member of the present invention;

FIG. 10b is a truth table and chart depicting some of the operating characteristics of the powertrain shown in FIG. 10a;

FIG. 11a is a schematic representation of a powertrain having a planetary transmission incorporating another family member of the present invention;

FIG. 11b is a truth table and chart depicting some of the operating characteristics of the powertrain shown in FIG. 11a;

FIG. 12a is a schematic representation of a powertrain having a planetary transmission incorporating another family member of the present invention; and FIG. 12b is a truth table and chart depicting some of the operating characteristics of the powertrain shown in FIG. 12a.

DETAILED DESCRIPTION OF THE PREFERRED EMBODIMENTS

Figures 1A, 1B:
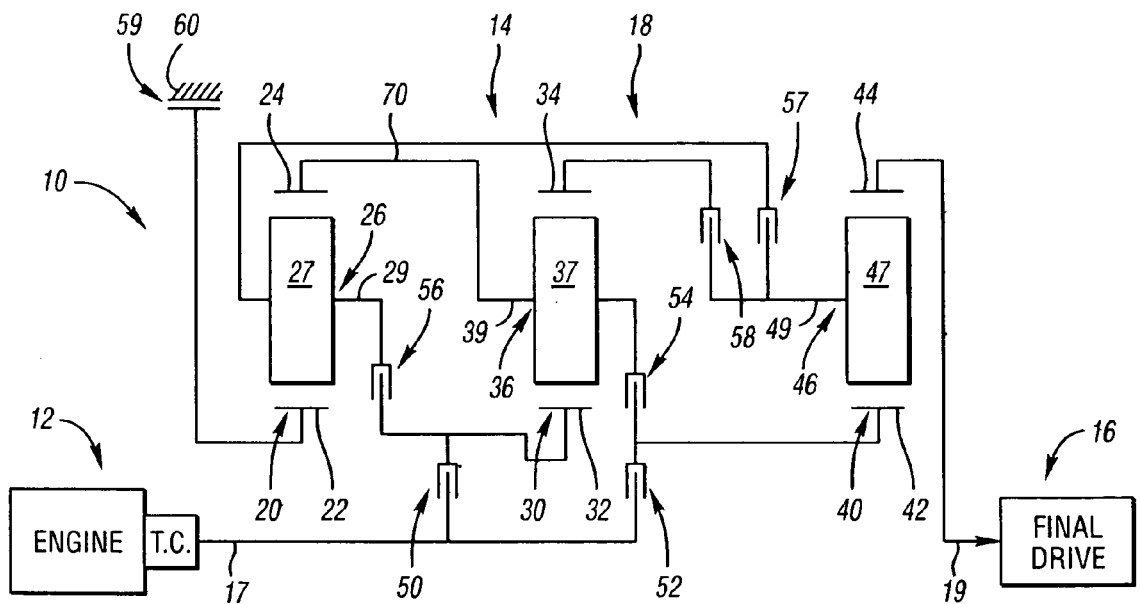

Referring to the drawings, wherein like characters represent the same or corresponding parts throughout the several views, there is shown in FIG. 1a a powertrain 10 having a conventional engine 12, a planetary transmission 14, and a conventional final drive mechanism 16.

The planetary transmission 14 includes an input shaft 17 connected with the engine 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49, wherein the pinion gears 47 are disposed in meshing relationship with both the sun gear member 42 and the ring gear member 44.

The planetary gear arrangement also includes seven torque-transmitting mechanisms 50, 52, 54, 56, 57, 58 and 59. The torque-transmitting mechanisms 50, 52, 54, 56, 57 and 58 are rotating-type torque-transmitting mechanisms, commonly termed clutches. The torque-transmitting mechanism 59 is a stationary-type torque transmitting mechanism, commonly termed brake or reaction clutch.

The input shaft 17 is not continuously connected with any planetary gear member. The output shaft 19 is continuously connected with the ring gear member 44. The ring gear member 24 is continuously connected with the planet carrier assembly member 36 through the interconnecting member 70.

The sun gear member 32 is selectively connectable with the input shaft 17 through the input clutch 50. The sun gear member 42 is selectively connectable with the input shaft 17 through the input clutch 52. The planet carrier assembly member 36 is selectively connectable with the sun gear member 42 through the clutch 54. The planet carrier assembly member 26 is selectively connectable with the sun gear member 32 through the clutch 56. The planet carrier assembly member 26 is selectively connectable with the planet carrier assembly member 46 through the clutch 57. The ring gear member 34 is selectively connectable with the planet carrier assembly member 46 through the clutch 58. The sun gear member 22 is selectively connectable with the transmission housing 60 through the brake 59.

As shown in FIG. 1b, and in particular the truth table disclosed therein, the torque-transmitting mechanisms are selectively engaged in combinations of five to provide eight forward speed ratios and one reverse speed ratio.

The reverse speed ratio is established with the engagement of the clutches. 52, 56, 57, 58 and the brake 59. The input clutch 52 connects the sun gear member 42 with the input shaft 17. The clutch 56 connects the planet carrier assembly member 26 with the sun gear member 32. The clutch 57 connects the planet carrier assembly member 26 with the planet carrier assembly member 46. The clutch 58 connects the ring gear member 34 with the planet carrier assembly member 46. The brake 59 connects the sun gear member 22 with the transmission housing 60. The planetary gear sets 20 and 30, and the planet carrier assembly member 46 do not rotate. The ring gear member 44 rotates at the same speed as the output shaft 19. The ring gear member 44, and therefore the output shaft 19, rotates at a speed determined from the speed of the sun gear member 42 and the ring gear/sun gear tooth ratio of the planetary gear set 40. The numerical value of the reverse speed ratio is determined utilizing the ring gear/sun gear tooth ratio of the planetary gear set 40.

The first forward speed ratio is established with the engagement of the clutches 50, 52, 57, 58 and the brake 59. The input clutch 50 connects the sun gear member 32 with the input shaft 17. The input clutch 52 connects sun gear member 42 with the input shaft 17. The clutch 57 connects the planet carrier assembly member 26 with the planet carrier assembly member 46. The clutch 58 connects the ring gear member 34 with the planet carrier assembly member 46. The brake 59 connects the sun gear member 22 with the transmission housing 60. The ring gear member 24 and the planet carrier assembly member 36 rotate at the same speed. The planet carrier assembly members 26, 46 and the ring gear member 34 rotate at the same speed. The sun gear members 32, 42 rotate at the same speed as the input shaft 17. The ring gear member 44 rotates at the same speed as the output shaft 19. The sun gear member 22 does not rotate. The ring gear member 24 rotates at a speed determined from the speed of the planet carrier assembly member 26 and the ring gear/sun gear tooth ratio of the planetary gear set 20. The ring gear member 34 rotates at a speed determined from the speed of the sun gear member 32, the speed of the planet carrier assembly member 36 and the ring gear/sun gear tooth ratio of the planetary gear set 30. The ring gear member 44, and therefore the output shaft 19, rotates at a speed determined from the speed of the sun gear member 42, the speed of the planet carrier assembly member 46 and the ring gear/sun gear tooth ratio of the planetary gear set 40. The numerical value of the first forward speed ratio is determined utilizing the ring gear/sun gear tooth ratios of the planetary gear sets 20, 30 and 40.

The second forward speed ratio is established with the engagement of the clutches 50, 54, 57, 58 and the brake 59. The input clutch 50 connects the sun gear member 32 to the input shaft 17. The clutch 54 connects the planet carrier assembly member 36 with the sun gear member 42. The clutch 57 connects the planet carrier assembly member 26 with the planet carrier assembly member 46. The clutch 58 connects the ring gear member 34 with the planet carrier assembly member 46. The brake 59 connects the sun gear member 22 with the transmission housing 60. The ring gear member 24, planet carrier assembly member 36 and sun gear member 42 rotate at the same speed. The sun gear member 32 rotates at the same speed as the input shaft 17. The planet carrier assembly member 26, the ring gear member 34 and the planet carrier assembly member 46 rotate at the same speed. The sun gear member 22 does not rotate. The ring gear member 44 rotates at the same speed as the output shaft 19. The planet carrier assembly member 26 rotates at a speed determined from the speed of the ring gear member 24 and the ring gear/sun gear tooth ratio of the planetary gear set 20. The ring gear member 34 rotates at a speed determined from the sun gear member 32, the planet carrier assembly member 36 and the ring gear/sun gear tooth ratio of the planetary gear set 30. The ring gear member 44, and therefore the output shaft 19, rotates at a speed determined from the speed of the sun gear member 42, the speed of the planet carrier assembly member 46 and the ring gear/sun gear tooth ratio of the planetary gear set 40. The numerical value of the second forward speed ratio is determined utilizing the ring gear/sun gear tooth ratios of the planetary gear sets 20, 30 and 40.

The third forward speed ratio is established with the engagement of the clutches 52, 54, 56, 57 and the brake 59. The input clutch 52 connects the sun gear member 42 with the input shaft 17. The clutch 54 connects the planet carrier assembly member 36 with the ring gear member 42. The clutch 56 connects the planet carrier assembly member 26 with the sun gear member 32. The clutch 57 connects the planet carrier assembly member 26 with the planet carrier assembly member 46. The brake 59 connects the sun gear member 22 with the transmission housing 60. The ring gear member 24, the planet carrier assembly member 36 and the sun gear member 42 rotate at the same speed as the input shaft 17. The planet carrier assembly member 26, the sun gear member 32 and the planet carrier assembly member 46 rotate at the same speed. The ring gear member 44 rotates at the same speed as the output shaft 19. The sun gear member 22 does not rotate. The planet carrier assembly member 26 rotates at a speed determined from the speed of the ring gear member 24 and the ring gear/sun gear tooth ratio of the planetary gear set 20. The ring gear member 44, and therefore the output shaft 19, rotates at a speed determined from the speed of the sun gear member 42, the speed of the planet carrier assembly member 46 and the ring gear/sun gear tooth ratio of the planetary gear set 40. The numerical value of the third forward speed ratio is determined utilizing the ring gear/sun gear tooth ratios of the planetary gear sets 20 and 40.

The fourth forward speed ratio is established with the engagement of the clutches 50, 54, 56, 57 and the brake 59. The input clutch 50 connects the sun gear member 32 with the input shaft 17. The clutch 54 connects the planet carrier assembly member 36 with the sun gear member 42. The clutch 56 connects the planet carrier assembly member 26 with the sun gear member 32. The clutch 57 connects the planet carrier assembly member 26 with the planet carrier assembly member 46. The brake 59 connects the sun gear member 22 with the transmission housing 60. The planet carrier assembly member 26, the sun gear member 32 and the planet carrier assembly member 46 rotate at the same speed as the input shaft 17. The ring gear member 24, the planet carrier assembly member 36 and the sun gear member 42 rotate at the same speed. The sun gear member 22 does not rotate. The ring gear member 44 rotates at the same speed as the output shaft 19. The ring gear member 24 rotates at a speed determined from the speed of the planet carrier assembly member 26 and the ring gear/sun gear tooth ratio of the planetary gear set 20. The ring gear member 44, and therefore the output shaft 19, rotates at a speed determined from the speed of the sun gear member 42, the planet carrier assembly member 46 and the ring gear/sun gear tooth ratio of the planetary gear set 40. The numerical value of the fourth forward speed is determined utilizing the ring gear/sun gear tooth ratios of the planetary gears set 20 and 40.

The fifth forward speed ratio is established with the engagement of the clutches 50, 52, 54, 56 and 58. In this configuration, the input shaft 17 is connected in a direct drive relationship with the output shaft 19. The numerical value of the fifth forward ratio is 1.

The sixth forward speed ratio is established with the engagement with the clutches 52, 54, 56, 58 and the brake 59. The input clutch 52 connects the sun gear member 42 with the input shaft 17. The clutch 54 connects the planet carrier assembly member 36 with the sun gear member 42. The clutch 56 connects the planet carrier assembly member 26 with the sun gear member 32. The clutch 58 connects the ring gear member 34 with the planet carrier assembly member 46. The brake 59 connects the sun gear member 22 with the transmission housing 60. The planet carrier assembly member 26 and the sun gear member 32 rotate at the same speed. The ring gear member 24, the planet carrier assembly member 36 and the sun gear member 42 rotate at the same speed as the input shaft 17. The ring gear member 34 and the planet carrier assembly member 46 rotate at the same speed. The ring gear member 44 rotates at the same speed as the output shaft 19. The sun gear member 22 does not rotate. The planet carrier assembly member 26 rotates at a speed determined from the speed of the ring gear member 24 and the ring gear/sun gear tooth ratio of the planetary gear set 20. The ring gear member 34 rotates at a speed determined from the speed of the sun gear member 32, the speed of the planet carrier assembly member 36 and the ring gear/sun gear tooth ratio of the planetary gear set 30. The ring gear member 44, and therefore the output shaft 19, rotates at a speed determined from the speed of the sun gear member 42, the speed of the planet carrier assembly member 46 and the ring gear/sun gear tooth ratio of the planetary gear set 40. The numerical value of the sixth forward speed ratio is determined utilizing the ring gear/sun gear tooth ratios of the planetary gear sets 20, 30 and 40.

The seventh forward speed ratio is established with the engagement of the clutches 50, 54, 56, 58 and the brake 59. The input clutch 50 connects the sun gear member 32 with the input shaft 17. The clutch 54 connects the planet carrier assembly member 36 with the sun gear member 42. The clutch 56 connects the planet carrier assembly member 26 with the sun gear member 32. The clutch 58 connects the ring gear member 34 with the planet carrier assembly member 46. The brake 59 connects the sun gear member 22 with the transmission housing 60. The planet carrier assembly member 26 and the sun gear member 32 rotate at the same speed as the input shaft 17. The ring gear member 24, the planet carrier assembly member 36 and the sun gear member 42 rotate at the same speed. The ring gear member 34 and the planet carrier assembly member 46 rotate at the same speed. The ring gear member 44 rotates at the same speed as the output shaft 19. The sun gear member 22 does not rotate. The ring gear member 24 rotates at a speed determined from the speed of the planet carrier assembly member 26 and the ring gear/sun gear tooth ratio of the planetary gear set 20. The ring gear member 34 rotates at a speed determined from the speed of the sun gear member 32, the speed of the planet carrier assembly member 36 and the ring gear/sun gear tooth ratio of the planetary gear set 30. The ring gear member 44, and therefore the output shaft 19, rotates at a speed determined from the speed of the sun gear member 42, the speed of the planet carrier assembly member 46 and the ring gear/sun gear tooth ratio of the planetary gear set 40. The numerical value of the seventh forward speed ratio is determined utilizing the ring gear/sun gear tooth ratios of the planetary gear sets 20, 30 and 40.

The eighth forward speed ratio is established with the engagement of the clutches 50, 52, 56, 58 and the brake 59. The input clutch 50 connects the sun gear member 32 with the input shaft 17. The input clutch 52 connects the sun gear member 32 with the input shaft 17. The clutch 56 connects the planet carrier assembly member 26 with the sun gear member 32. The clutch 58 connects the ring gear member 34 with the planet carrier assembly member 46. The brake 59 connects the sun gear member 22 with the transmission housing 60. The planet carrier assembly member 26 and the sun gear members 32 and 42 rotate at the same speed as the input shaft 17. The ring gear member 24 and the planet carrier assembly member 36 rotate at the same speed. The ring gear member 34 and the planet carrier assembly member 46 rotate at the same speed. The ring gear member 44 rotates at the same speed as the output shaft 19. The sun gear member 22 does not rotate. The ring gear member 24 rotates at a speed determined from the speed of the planet carrier assembly member 26 and the ring gear/sun gear tooth ratio of the planetary gear set 20. The ring gear member 34 rotates at a speed determined from the speed of the sun gear member 32, the speed of the planet carrier assembly member 36 and the ring gear/sun gear tooth ratio of the planetary gear set 30. The ring gear member 44, and therefore the output shaft 19, rotates at a speed determined from the speed of the sun gear member 42, the speed of the planet carrier assembly member 46 and the ring gear/sun gear tooth ratio of the planetary gear set 40. The numerical value of the eighth forward speed ratio is determined utilizing the ring gear/sun gear tooth ratios of the planetary gear sets 20, 30 and 40.

As set forth above, the engagement schedule for the torque-transmitting mechanisms is shown in the truth table of FIG. 1$b$. This truth table also provides an example of speed ratios that are available utilizing the ring gear/sun gear tooth ratios given by way of example in FIG. 1$b$. The $N_{R1}/N_{S1}$ value is the tooth ratio of the planetary gear set 20; the $N_{R2}/N_{S2}$ value is the tooth ratio of the planetary gear set 30; and the $N_{R3}/N_{S3}$ value is the tooth ratio of the planetary gear set 40. Also, the chart of FIG. 1$b$ describes the ratio steps that are attained utilizing the sample of tooth ratios given. For example, the step ratio between the first and second forward speed ratios is 1.76, while the step ratio between the reverse and first forward ratio is −0.54.

Description of a Second Exemplary Embodiment

Figures 2A, 2B:
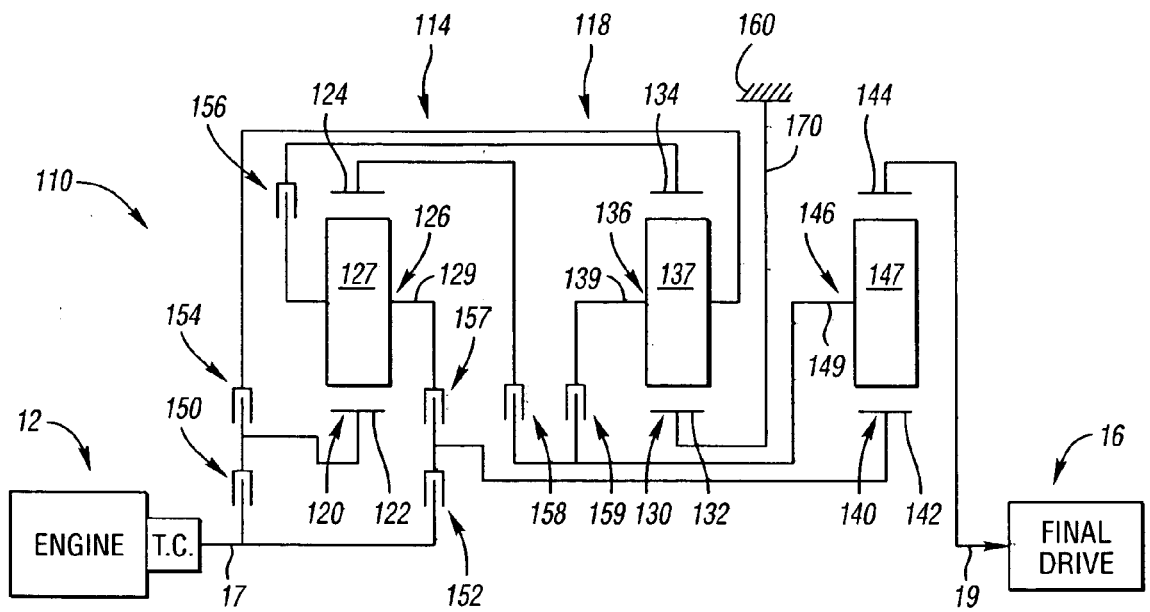

FIG. 2a shows a powertrain 110 having a conventional engine 12, a planetary transmission 114, and a conventional final drive mechanism 16.

The planetary transmission 114 includes an input shaft 17 continuously connected with the engine 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes seven torque-transmitting mechanisms 150, 152, 154, 156, 157, 158 and 159. The torque-transmitting mechanisms 150, 152, 154, 156, 157, 158 and 159 are rotating-type torque-transmitting mechanisms, commonly termed clutches.

The input shaft 17 is not continuously connected with any planetary gear member. The output shaft 19 is continuously connected with the ring gear member 144. The sun gear member 132 is continuously connected with the transmission housing 160 through the interconnecting member 170.

The sun gear member 122 is selectively connectable with the input shaft 17 through the input clutch 150. The ring gear member 142 is selectively connectable with the input shaft 17 through the input clutch 152. The sun gear member 122 is selectively connectable with the planet carrier assembly member 136 through the clutch 154. The planet carrier assembly member 126 is selectively connectable with the ring gear member 134 through the clutch 156. The planet carrier assembly member 126 is selectively connectable with the sun gear member 142 through the clutch 157. The ring gear member 124 is selectively connectable with the planet carrier assembly member 146 through the clutch 158. The planet carrier assembly member 136 is selectively connectable with the planet carrier assembly member 146 through the clutch 159.

The truth table of FIG. 2b describes the engagement sequence utilized to provide eight forward speed ratios and one reverse speed ratio in the planetary gear arrangement 118 shown in FIG. 2a.

The truth tables given in FIGS. 2b, 3b, 4b, 5b, 6b, 7b, 8b, 9b, 10b, 11b and 12b show the engagement sequences for the torque-transmitting mechanisms to provide at least eight forward speed ratios and at least one reverse ratio. As shown and described above for the configuration in FIG. 1a, those skilled in the art will understand from the respective truth tables how the speed ratios are established through the planetary gear sets identified in the written description.

As set forth above, the truth table of FIG. 2b describes the engagement sequence of the torque-transmitting mechanisms utilized to provide the reverse drive ratios and eight forward speed ratios. The truth table also provides an example of the ratios that can be attained with the family members shown in FIG. 2a utilizing the sample tooth ratios given in FIG. 2b. The $N_{R1}/N_{S1}$ value is the tooth ratio of the planetary gear set 120; the $N_{R2}/N_{S2}$ value is the tooth ratio of the planetary gear set 130; and the $N_{R3}/N_{S3}$ value is the tooth ratio of the planetary gear set 140. Also shown in FIG. 2b are the ratio steps between single step ratios in the forward direction as well as the reverse to first step ratio. For example, the first to second step ratio is 1.62.

Description of a Third Exemplary Embodiment

Figures 3A, 3B:
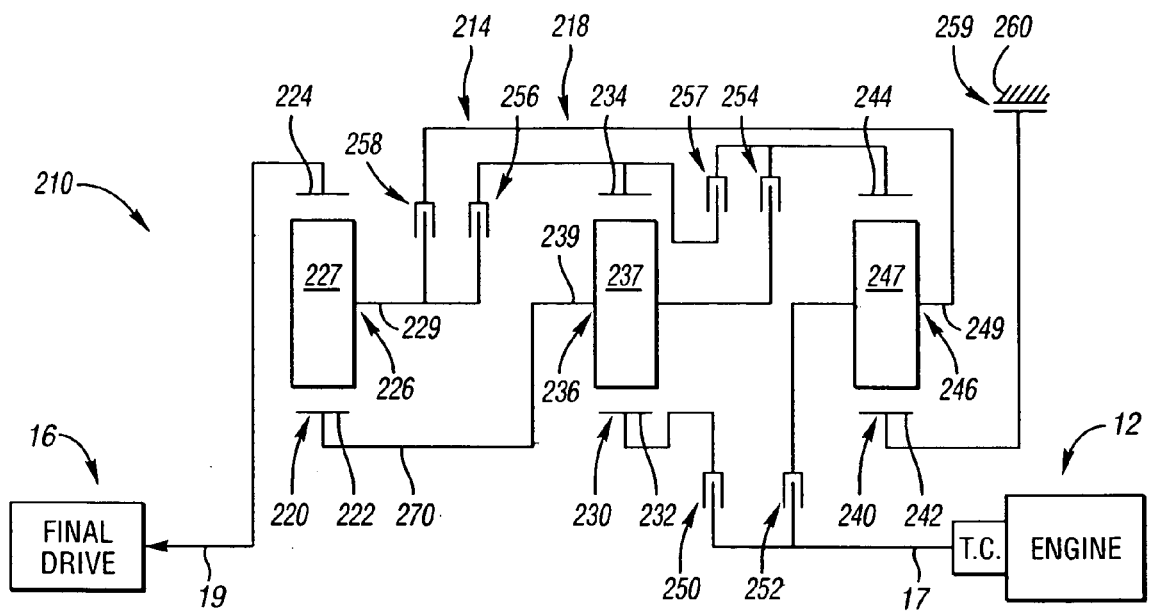

Turning to FIG. 3a, a powertrain 210 includes the engine 12, a planetary transmission 214, and a final drive mechanism 16. The planetary transmission 214 includes an input shaft 17 continuously connected with the engine 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear arrangement 218 also includes seven torque-transmitting mechanisms 250, 252, 254, 256, 257, 258 and 259; The torque-transmitting mechanisms 250, 252, 254, 256, 257 and 258 are rotating type torque-transmitting mechanisms, commonly termed clutches. The torque-transmitting mechanism 259 is a stationary-type torque transmitting mechanism, commonly termed brake or reaction clutch.

The input shaft 17 is not continuously connected with any planetary gear member. The output shaft 19 is continuously connected with the ring gear member 224. The sun gear member 222 is continuously connected with the planet carrier assembly member 236 through the interconnecting member 270.

The sun gear member 232 is selectively connectable with the input shaft 17 through the input clutch 250. The planet carrier assembly member 246 is selectively connectable with the input shaft 17 through the input clutch 252. The planet carrier assembly member 236 is selectively connectable with the ring gear member 244 through the clutch 254. The planet carrier assembly member 226 is selectively connectable with the ring gear member 234 through the clutch 256. The ring gear member 234 is selectively connectable with the ring gear member 244 through the clutch 257. The planet carrier assembly member 226 is selectively connectable with the planet carrier assembly member 246 through the clutch 258. The sun gear member 242 is selective connectable with the transmission housing 260 through the brake 259.

As shown in the truth table in FIG. 3b, the torque-transmitting mechanisms are engaged in combinations of five to establish eight forward speed ratios and two reverse speed ratios.

As previously set forth, the truth table of FIG. 3b describes the combinations of engagements utilized for the forward and reverse speed ratios. The truth table also provides an example of speed ratios that are available with the family member described above. These examples of speed ratios are determined utilizing the tooth ratios given in FIG. 3b. The $N_{R1}/N_{S1}$ value is the tooth ratio of the planetary gear set 220; the $N_{R2}/N_{S2}$ value is the tooth ratio of the planetary gear set 230; and the $N_{R3}/N_{S3}$ value is the tooth ratio of the planetary gear set 240. Also depicted in FIG. 3b is a chart representing the ratio steps between adjacent forward speed ratios and between the first and reverse speed ratio. For example, the first to second ratio interchange has a step of 1.61.

Description of a Fourth Exemplary Embodiment

Figures 4A, 4B:
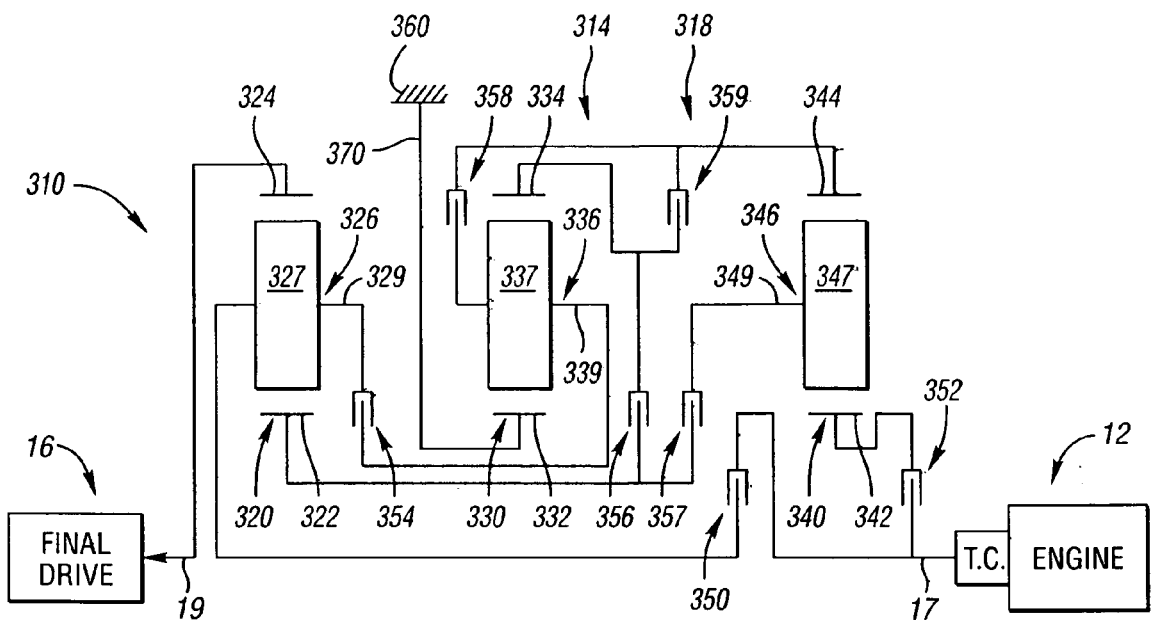

A powertrain 310, shown in FIG. 4a, includes the engine 12, a planetary transmission 314, and the final drive mechanism 16. The planetary transmission 314 includes an input shaft 17 continuously connected with the engine 12, a planetary gear arrangement 318, and an output shaft 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes seven torque-transmitting mechanisms 350, 352, 354, 356, 357, 358 and 359. The torque-transmitting mechanisms 350, 352, 354, 356, 357, 358 and 359 are rotating type torque-transmitting mechanisms, commonly termed clutches.

The input shaft 17 is not continuously connected with any planetary gear member. The output shaft 19 is continuously connected with the ring gear member 324. The sun gear member 332 is continuously connected with the transmission housing 360 through the interconnecting member 370.

The planet carrier assembly member 326 is selectively connectable with the input shaft 17 through the input clutch 350. The sun gear member 342 is selectively connectable with the input shaft 17 through the input clutch 352. The planet carrier assembly member 326 is selectively connectable with the planet carrier assembly member 336 through the clutch 354. The sun gear member 322 is selectively connectable with the ring gear member 334 through the clutch 356. The sun gear member 322 is selectively connectable with the planet carrier assembly member 346 through the clutch 357. The planet carrier assembly member 336 is selectively connectable with the ring gear member 344 through the clutch 358. The ring gear member 334 is selectively connectable with the ring gear member 344 through the clutch 359.

The truth table shown in FIG. 4b describes the engagement combination and the engagement sequence necessary to provide the reverse drive ratio and eight forward speed ratios. A sample of the numerical values for the ratios is also provided in the truth table of FIG. 4b. These values are determined utilizing the ring gear/sun gear tooth ratios also given in FIG. 4b. The $N_{R1}/N_{S1}$ value is the tooth ratio for the planetary gear set 320; the $N_{R2}/N_{S2}$ value is the tooth ratio for the planetary gear set 330; and the $N_{R3}/N_{S3}$ value is the tooth ratio for the planetary gear set 340. Also given in FIG. 4b is a chart describing the step ratios between the adjacent forward speed ratios and the reverse to first forward speed ratio. For example, the first to second forward speed ratio step is 1.60.

Description of a Fifth Exemplary Embodiment

Figures 5A, 5B:
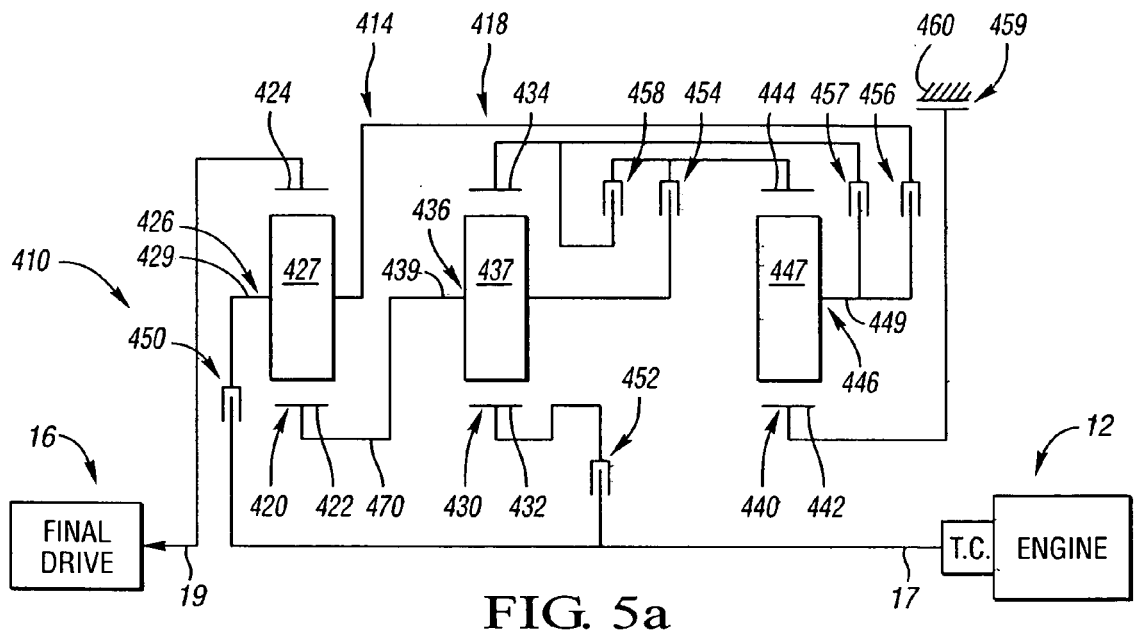

A powertrain 410, shown in FIG. 5a, includes the engine 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422, a ring gear member 424, and a planet carrier assembly member 426. The planet carrier assembly member 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the ring gear member 434 and the sun gear member 432.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the ring gear member 444 and the sun gear member 442.

The planetary gear arrangement 418 also includes seven torque-transmitting mechanisms 450, 452, 454, 456, 457, 458 and 459. The torque-transmitting mechanisms 450, 452, 454, 456, 457 and 458 are rotating type torque-transmitting mechanisms, commonly termed clutches. The torque-transmitting mechanism 459 is a stationary-type torque transmitting mechanism, commonly termed brake or reaction clutch.

The input shaft 17 is not continuously connected with any planetary gear member. The output shaft 19 is continuously connected with the ring gear member 424. The sun gear member 422 is continuously connected with the planet carrier assembly member 436 through the interconnecting member 470.

The planet carrier assembly member 426 is selectively connectable with the input shaft 17 through the input clutch 450. The sun gear member 432 is selectively connectable with the input shaft 17 through the input clutch 452. The planet carrier assembly member 436 is selectively connectable with the ring gear member 444 through the clutch 454. The planet carrier assembly member 426 is selectively connectable with the planet carrier assembly member 446 through the clutch 456. The ring gear member 434 is selectively connectable with the planet carrier assembly member 446 through the clutch 457. The ring gear member 434 is selectively connectable with the ring gear member 444 through the clutch 458. The sun gear member 442 is selectively connectable with the transmission housing 460 through the brake 459.

The truth table shown in FIG. 5b describes the engagement combination and sequence of the torque-transmitting mechanisms 450, 452, 454, 456, 457, 458 and 459 that are employed to provide the forward and reverse drive ratios.

Also given in the truth table of FIG. 5b is a set of numerical values that are attainable with the present invention utilizing the ring gear/sun gear tooth ratios shown. The $N_{R1}/N_{S1}$ value is the tooth ratio of the planetary gear set 420; the $N_{R2}/N_{S2}$ value is the tooth ratio of the planetary gear set 430; and the $N_{R3}/N_{S3}$ value is the tooth ratio of the planetary gear set 440.

FIG. 5b also provides a chart of the ratio steps between adjacent forward ratios and between the reverse and first forward ratio. For example, the ratio step between the first and second forward ratios is 1.61.

Description of a Sixth Exemplary Embodiment

Figures 6A, 6B:
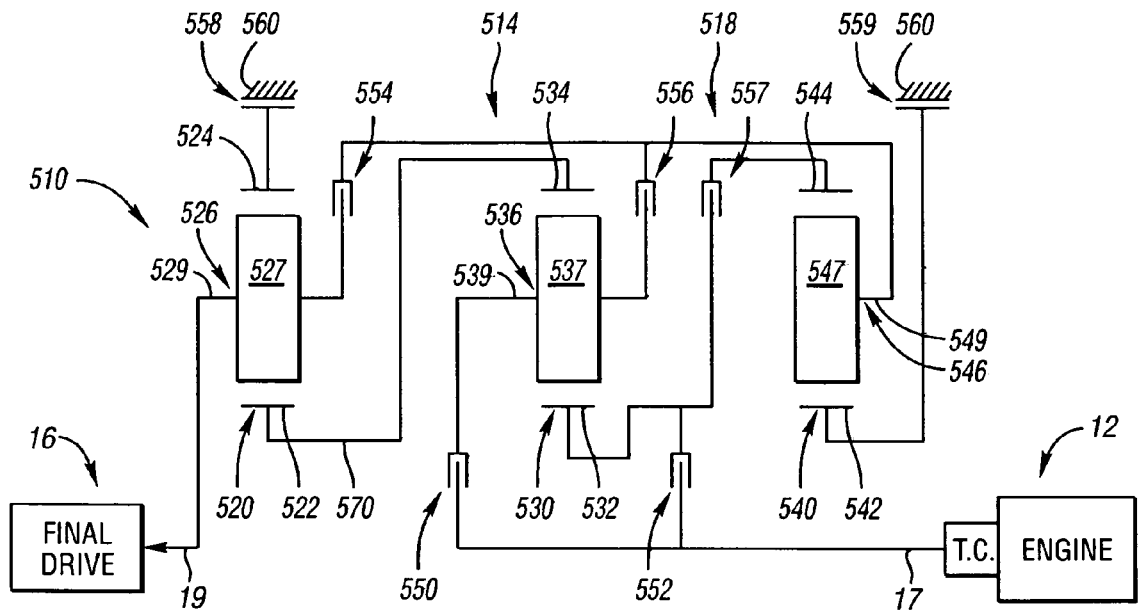

A powertrain 510, shown in FIG. 6a, includes an engine 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly member 526. The planet carrier assembly member 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes seven torque-transmitting mechanisms 550, 552, 554, 556, 557, 558 and 559. The torque-transmitting mechanisms 550, 552, 554, 556 and 557 are rotating type torque-transmitting mechanisms, commonly termed clutches. The torque-transmitting mechanisms 558 and 559 are stationary-type torque transmitting mechanisms, commonly termed brakes or reaction clutches.

The input shaft 17 is not continuously connected with any planetary gear member. The output shaft 19 is continuously connected with the planet carrier assembly member 526. The sun gear member 522 is continuously connected with the ring gear member 534 through the interconnecting member 570.

The planet carrier assembly member 536 is selectively connectable with the input shaft 17 through the input clutch 550. The sun gear member 532 is selectively connectable with the input shaft 17 through the input clutch 552. The planet carrier assembly member 526 is selectively connectable with the planet carrier assembly member 546 through the clutch 554. The planet carrier assembly member 536 is selectively connectable with the planet carrier assembly member 546 through the clutch 556. The sun gear member 532 is selectively connectable with the ring gear member 544 through the clutch 557. The ring gear member 524 is selectively connectable with the transmission housing 560 through the brake 558. The sun gear member 542 is selectively connectable with the transmission housing 560 through the brake 559.

The truth table shown in FIG. 6b describes the engagement sequence and combination of the torque-transmitting mechanisms to provide one reverse speed ratio and eight forward speed ratios. The chart of FIG. 6b describes the ratio steps between adjacent forward speed ratios and the ratio step between the reverse and first forward speed ratio.

The sample speed ratios given in the truth table are determined utilizing the tooth ratio values also given in FIG. 6b. The $N_{R1}/N_{S1}$ value is the tooth ratio of the planetary gear set 520; the $N_{R2}/N_{S2}$ value is the tooth ratio of the planetary gear set 530; and the $N_{R3}/N_{S3}$ value is the tooth ratio of the planetary gear set 540.

Description of a Seventh Exemplary Embodiment

Figures 7A, 7B:
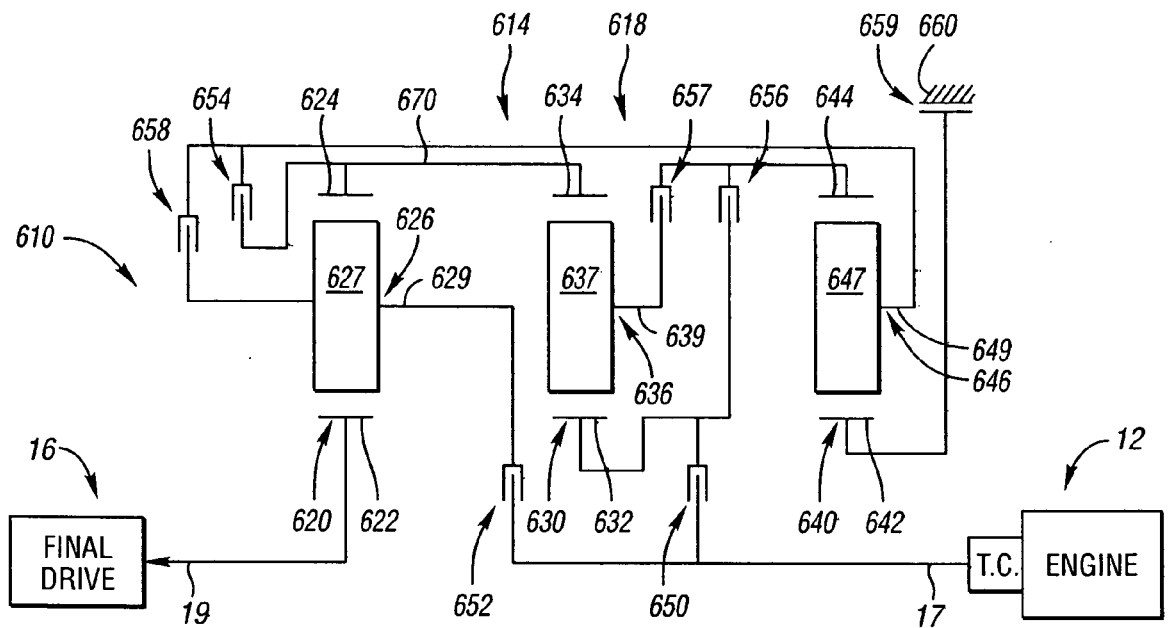

A powertrain 610, shown in FIG. 7a, has the engine 12, a planetary transmission 614 and the final drive mechanism 16. The planetary transmission 614 includes the input shaft 17, a planetary gear arrangement 618 and the output shaft 19. The planetary gear arrangement 618 includes three planetary gear sets 620, 630 and 640.

The planetary gear set 620 includes a sun gear member 622, a ring gear member 624, and a planet carrier assembly member 626. The planet carrier assembly member 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear arrangement 618 also includes seven torque-transmitting mechanisms 650, 652, 654, 656, 657, 658 and 659. The torque-transmitting mechanisms 650, 652, 654, 656, 657 and 658 are rotating type torque-transmitting mechanisms, commonly termed clutches. The torque-transmitting mechanism 659 is a stationary-type torque transmitting mechanism, commonly termed brake or reaction clutch.

The input shaft 17 is not continuously connected with any planetary gear member. The output shaft 19 is continuously connected with the sun gear member 622. The ring gear member 624 is continuously connected with the ring gear member 634 through the interconnecting member 670.

The sun gear member 632 is selectively connectable with the input shaft 17 through the input clutch 650. The planet carrier assembly member 626 is selectively connectable with the input shaft 17 through the input clutch 652. The ring gear member 624 is selectively connectable with the planet carrier assembly member 646 through the clutch 654. The sun gear member 632 is selectively connectable with the ring gear member 644 through the clutch 656. The planet carrier assembly member 636 is selectively connectable with the ring gear member 644 through the clutch 657. The planet carrier assembly member 626 is selectively connectable with the planet carrier assembly member 646 through the clutch 658. The sun gear member 642 is selectively connectable with the transmission housing 660 through the brake 659.

The truth table shown in FIG. 7b describes the combination of torque-transmitting mechanism engagements that will provide one reverse drive ratio and eight forward speed ratios, as well as the sequence of these engagements and interchanges.

The ratio values given are by way of example and are established utilizing the ring gear/sun gear tooth ratios given in FIG. 7b. For example, the $N_{R1}/N_{S1}$ value is the tooth ratio of the planetary gear set 620; the $N_{R2}/N_{S2}$ value is the tooth ratio of the planetary gear set 630; and the $N_{R3}/N_{S3}$ value is the tooth ratio of the planetary gear set 640. The ratio steps between adjacent forward ratios and the reverse to first ratio are also given in FIG. 7b.

Description of an Eighth Exemplary Embodiment

Figures 8A, 8B:
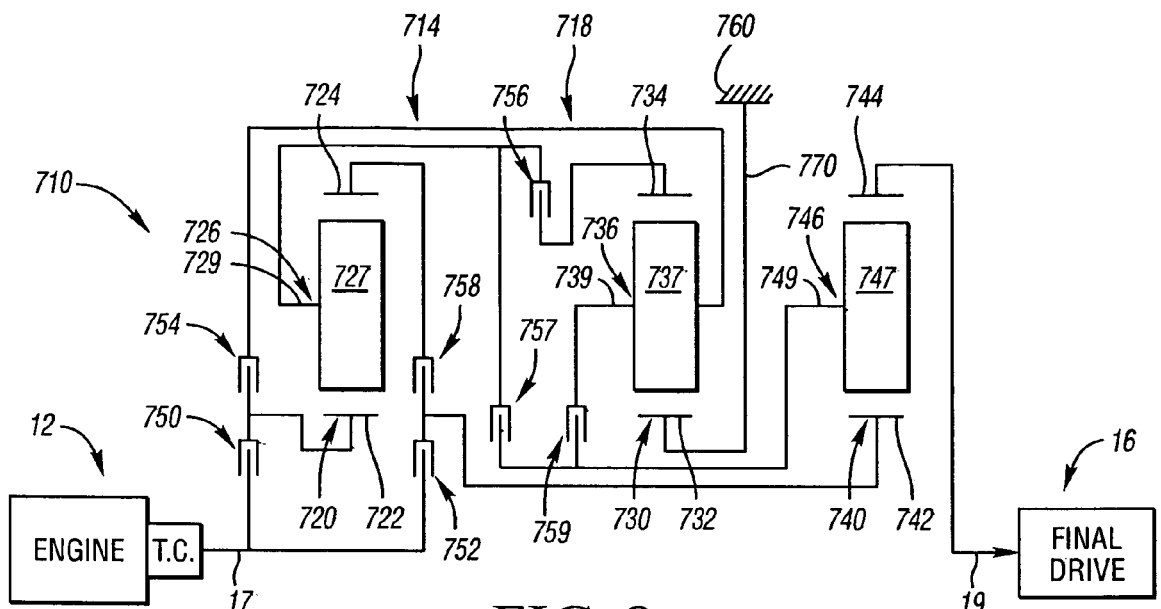

A powertrain 710, shown in FIG. 8a, has the conventional engine 12, a planetary transmission 714, and the conventional final drive mechanism 16. The engine 12 is drivingly connected with the planetary transmission 714 through the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, and a third planetary gear set 740.

The planetary gear set 720 includes a sun gear member 722, a ring gear member 724, and a planet carrier assembly member 726. The planet carrier assembly member 726 includes a plurality of pinion gears 727 rotatably mounted on a carrier member 729 and disposed in meshing relationship with both the sun gear member 722 and the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744

The planetary gear arrangement 718 also includes seven torque-transmitting mechanisms 750, 752, 754, 756, 757, 758 and 759. The torque-transmitting mechanisms 750, 752, 754, 756, 757, 758 and 759 are rotating type torque-transmitting mechanisms, commonly termed clutches.

The input shaft 17 is not continuously connected with any planetary gear member. The output shaft 19 is continuously connected with the ring gear member 744. The sun gear member 732 is continuously connected with the transmission housing 760 through the interconnecting member 770.

The sun gear member 722 is selectively connectable with the input shaft 17 through the input clutch 750. The sun gear member 742 is selectively connectable with the input shaft 17 through the input clutch 752. The sun gear member 722 is selectively connectable with the planet carrier assembly member 736 through the clutch 754. The planet carrier assembly member 726 is selectively connectable with the ring gear member 734 through the clutch 756. The planet carrier assembly member 726 is selectively connectable with the planet carrier assembly member 746 through the clutch 757. The ring gear member 724 is selectively connectable with the sun gear member 742 through the clutch 758. The planet carrier assembly member 736 is selectively connectable with the planet carrier assembly member 746 through the clutch 759.

The truth table of FIG. 8b defines the torque-transmitting mechanism engagement sequence utilized for each of the forward and reverse speed ratios. Also given in the truth table is a set of numerical values that are attainable with the present invention utilizing the ring gear/sun gear tooth ratios given in FIG. 8b. The $N_{R1}/N_{S1}$ value is the tooth ratio of the planetary gear set 720; the $N_{R2}/N_{S2}$ value is the tooth ratio of the planetary gear set 730; and the $N_{R3}/N_{S3}$ value is the tooth ratio of the planetary gear set 740.

FIG. 8b also provides a chart of the ratio steps between adjacent forward ratios and between the reverse and first forward ratio. For example, the ratio step between the first and second forward ratios is 1.41.

Description of a Ninth Exemplary Embodiment

Figures 9A, 9B:
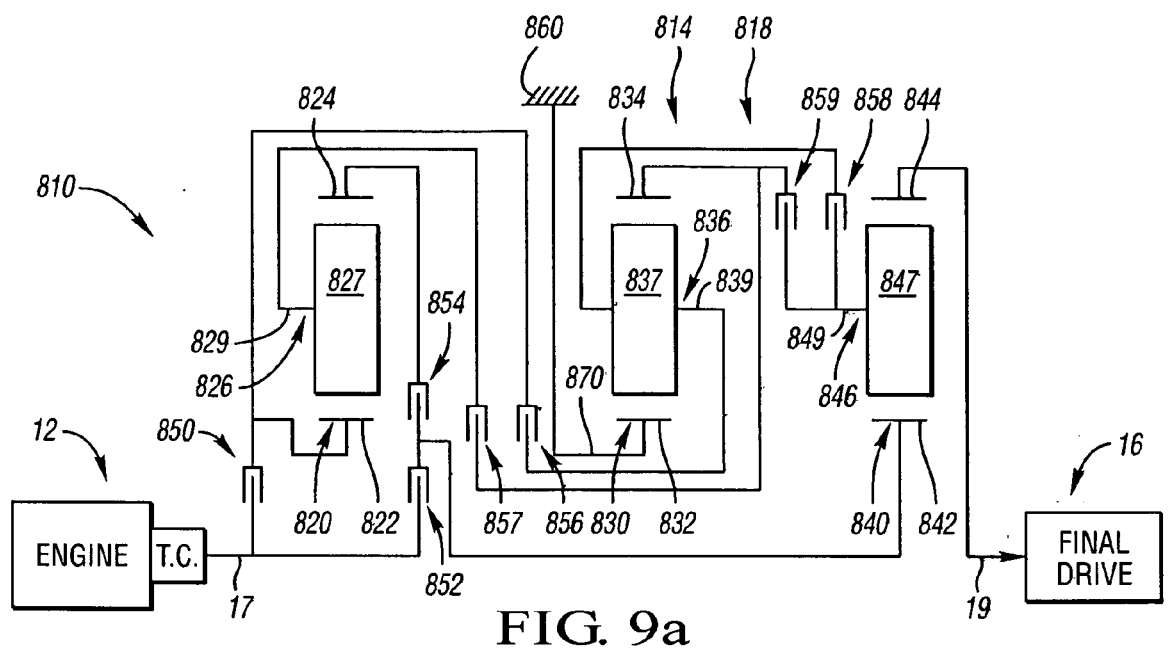

A powertrain 810, shown in FIG. 9a, has the conventional engine 12, a planetary transmission 814, and the final drive mechanism 16. The engine 12 is drivingly connected with the planetary transmission 814 through the input shaft 17. The planetary transmission 814 is drivingly connected with the final drive mechanism 16 through the output shaft 19. The planetary transmission 814 includes a planetary gear arrangement 818 that has a first planetary gear set 820, a second planetary gear set 830, and a third planetary gear set 840.

The planetary gear set 820 includes a sun gear member 822, a ring gear member 824, and a planet carrier assembly member 826. The planet carrier assembly member 826 includes a plurality of pinion gears 827 rotatably mounted on a carrier member 829 and disposed in meshing relationship with both the sun gear member 822 and the ring gear member 824.

The planetary gear set 830 includes a sun gear member 832, a ring gear member 834, and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the ring gear member 844 and the sun gear member 842.

The planetary gear arrangement 818 also includes seven torque-transmitting mechanisms 850, 852, 854, 856, 857, 858 and 859. The torque-transmitting mechanisms 850, 852, 854, 856, 857, 858 and 859 are rotating type torque-transmitting mechanisms, commonly termed clutches.

The input shaft 17 is not continuously connected with any planetary gear member. The output shaft 19 is continuously connected with the ring gear member 844. The sun gear member 832 is continuously connected with the transmission housing 860 through the interconnecting member 870.

The sun gear member 822 is selectively connectable with the input shaft 17 through the input clutch 850. The sun gear member 842 is selectively connectable with the input shaft 17 through the input clutch 852. The ring gear member 824 is selectively connectable with the sun gear member 842 through the clutch 854. The sun gear member 822 is selectively connectable with the planet carrier assembly member 836 through the clutch 856. The planet carrier assembly member 826 is selectively connectable with the ring gear member 834 through the clutch 857. The planet carrier assembly member 836 is selectively connectable with the planet carrier assembly member 846 through the clutch 858. The ring gear member 834 is selectively connectable with the planet carrier assembly member 846 through the clutch 859.

The truth table shown in FIG. 9b defines the torque-transmitting mechanism engagement sequence that provides one reverse speed ratio and eight forward speed ratios shown in the truth table and available with the planetary gear arrangement 818. A sample of numerical values for the individual ratios is also given in the truth table of FIG. 9b. These numerical values have been calculated using the ring gear/sun gear tooth ratios also given by way of example in FIG. 9b. The $N_{R1}/N_{S1}$ value is the tooth ratio of the planetary gear set 820; the $N_{R2}/N_{S2}$ value is the tooth ratio of the planetary gear set 830; and the $N_{R3}/N_{S3}$ value is the tooth ratio of the planetary gear set 840. FIG. 9b also describes the ratio steps between adjacent forward ratios and between the reverse and first forward ratio.

Description of a Tenth Exemplary Embodiment

Figures 10A, 10B:
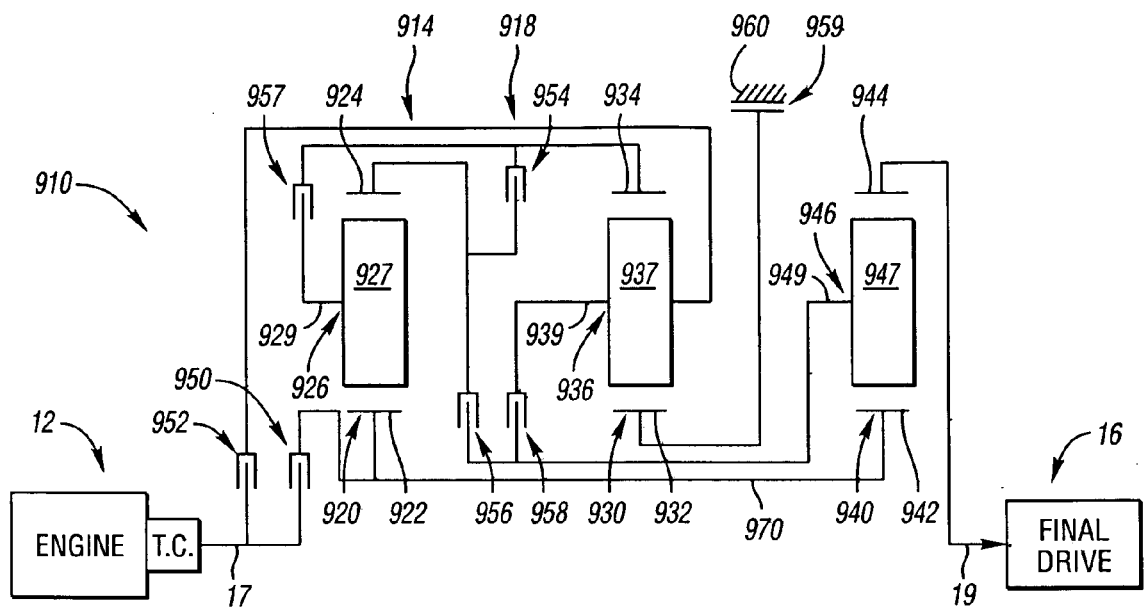

The powertrain 910, shown in FIG. 10a, includes the conventional engine 12, a planetary transmission 914, and the conventional final drive mechanism 16. The engine 12 is drivingly connected with the planetary transmission 914 through the input shaft 17. The planetary transmission 914 is drivingly connected with the final drive mechanism 16 through the output shaft 19. The planetary transmission 914 includes a planetary gear arrangement 918 that has a first planetary gear set 920, a second planetary gear set 930, and a third planetary gear set 940.

The planetary gear set 920 includes a sun gear member 922, a ring gear member 924, and a planet carrier assembly member 926. The planet carrier assembly member 926 includes a plurality of pinion gears 927 that are rotatably mounted on a carrier member 929 and disposed in meshing relationship with both the sun gear member 922 and the ring gear member 924.

The planetary gear set 930 includes a sun gear member 932, a ring gear member 934, and a planet carrier assembly member 936. The planet carrier assembly member 936 includes a plurality of pinion gears 937 rotatably mounted on a carrier member 939 and disposed in meshing relationship with both the sun gear member 932 and the ring gear member 934.

The planetary gear set 940 includes a sun gear member 942, a ring gear member 944, and a planet carrier assembly member 946. The planet carrier assembly member 946 includes a plurality of pinion gears 947 rotatably mounted on a carrier member 949 and disposed in meshing relationship with both the sun gear member 942 and the ring gear member 944.

The planetary gear arrangement 918 also includes seven torque-transmitting mechanisms 950, 952, 954, 956, 957, 958 and 959. The torque-transmitting mechanisms 950, 952, 952, 956, 957 and 958 are rotating-type torque-transmitting mechanisms, commonly termed clutches. The torque-transmitting mechanism 959 is a stationary-type torque-transmitting mechanism, commonly termed brake or reaction clutch.

The input shaft 17 is not continuously connected with any planetary gear member. The output shaft 19 is continuously connected with the ring gear member 944. The sun gear member 922 is continuously connected with the sun gear member 942 through the interconnecting member 970.

The sun gear member 922 is selectively connectable with the input shaft 17 through the input clutch 950. The planet carrier assembly member 936 is selectively connectable with the input shaft 17 through the input clutch 952. The ring gear member 924 is selectively connectable with the ring gear member 934 through the clutch 954. The ring gear member 924 is selectively connectable with the planet carrier assembly member 946 through the clutch 956. The planet carrier assembly member 926 is selectively connectable with the ring gear member 934 through the clutch 957. The planet carrier assembly member 936 is selectively connectable with the planet carrier assembly member 946 through the clutch 958. The sun gear member 932 is selectively connectable with the transmission housing 960 through the brake 959.

The truth table of FIG. 10b describes the torque-transmitting mechanism engagement sequence utilized to provide the reverse speed ratio and eight forward speed ratios. The truth table also provides a set of examples for the ratios for each of the reverse and forward speed ratios. These numerical values have been determined utilizing the ring gear/sun gear tooth ratios given in FIG. 10b. The $N_{R1}/N_{S1}$ value is the tooth ratio of the planetary gear set 920; the $N_{R2}/N_{S2}$ value is the tooth ratio of the planetary gear set 930; and the $N_{R3}/N_{S3}$ value is the tooth ratio of the planetary gear set 940.

Description of an Eleventh Exemplary Embodiment

Figures 11A, 11B:
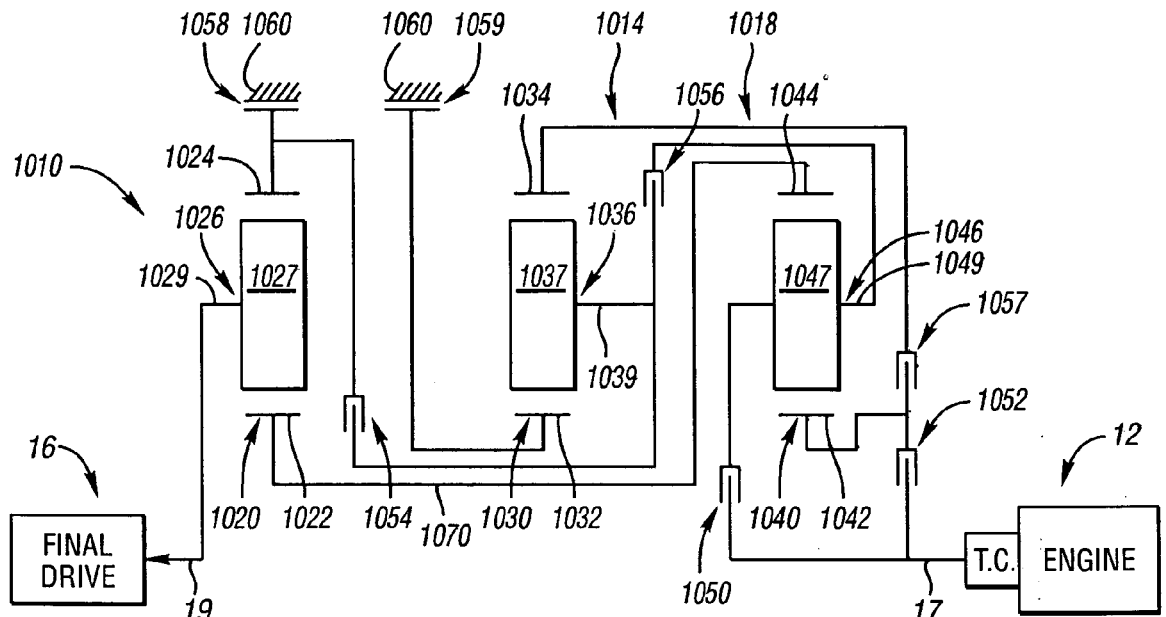

A powertrain 1010, shown in FIG. 11a, includes the conventional engine 12, a planetary transmission 1014, and the conventional final drive mechanism 16. The engine is drivingly connected with the planetary transmission 1014 through the input shaft 17. The planetary transmission 1014 is drivingly connected with the final drive mechanism 16 through the output shaft 19. The planetary transmission 1014 includes a planetary gear arrangement 1018 that has a first planetary gear set 1020, a second planetary gear set 1030, and a third planetary gear set 1040.

The planetary gear set 1020 includes a sun gear member 1022, a ring gear member 1024, and a planet carrier assembly member 1026. The planet carrier assembly member 1026 includes a plurality of pinion gears 1027 rotatably mounted on a carrier member 1029 and disposed in meshing relationship with both the ring gear member 1024 and the sun gear member 1022.

The planetary gear set 1030 includes a sun gear member 1032, a ring gear member 1034, and a planet carrier assembly member 1036. The planet carrier assembly member 1036 includes a plurality of pinion gears 1037 rotatably mounted on a carrier member 1039 and disposed in meshing relationship with both the ring gear member 1034 and the sun gear member 1032.

The planetary gear set 1040 includes a sun gear member 1042, a ring gear member 1044, and a planet carrier assembly member 1046. The planet carrier assembly member 1046 includes a plurality of pinion gears 1047 rotatably mounted on a carrier member 1049 and disposed in meshing relationship with both the ring gear member 1044 and the sun gear member 1042.

The planetary gear arrangement 1018 also includes seven torque-transmitting mechanisms 1050, 1052, 1054, 1056, 1057, 1058 and 1059. The torque-transmitting mechanisms 1050, 1052, 1054, 1056 and 1057 are rotating-type torque-transmitting mechanisms, commonly termed clutches. The torque-transmitting mechanisms 1058 and 1059 are stationary-type torque-transmitting mechanisms, commonly termed brakes, or reaction clutches.

The input shaft 17 is not continuously connected with any planetary gear member. The output shaft 19 is continuously connected with the planet carrier assembly member 1026. The sun gear member 1022 is continuously connected with the ring gear member 1044 through the interconnecting member 1070.

The planet carrier assembly member 1046 is selectively connectable with the input shaft 17 through the input clutch 1050. The sun gear member 1042 is selectively connectable with the input shaft 17 through the input clutch 1052. The ring gear member 1024 is selectively connectable with the planet carrier assembly member 1036 through the clutch 1054. The planet carrier assembly member 1036 is selectively connectable with the planet carrier assembly member 1046 through the clutch 1056. The ring gear member 1034 is selectively connectable with the sun gear member 1042 through the clutch 1057. The ring gear member 1024 is selectively connectable with the transmission housing 1060 through the brake 1058. The sun gear member 1032 is selectively connectable with the transmission housing 1060 through the brake 1059.

The truth table shown in FIG. 11*b* describes the engagement combinations and the engagement sequence necessary to provide the reverse drive ratio and eight forward speed ratios. A sample of the numerical values for the ratios is also provided in the truth table of FIG. 11*b*. These values are determined utilizing the ring gear/sun gear tooth ratios also given in FIG. 11*b*. The $N_{R1}/N_{S1}$ value is the tooth ratio for the planetary gear set 1020; the $N_2/N_{S2}$ value is the tooth ratio for the planetary gear set 1030; and the $N_{R3}/N_{S3}$ value is the tooth ratio for the planetary gear set 1040. Also given in FIG. 11*b* is a chart describing the step ratios between the adjacent forward speed ratios and the reverse to first forward speed ratio.

Description of a Twelfth Exemplary Embodiment

Figures 12A, 12B:
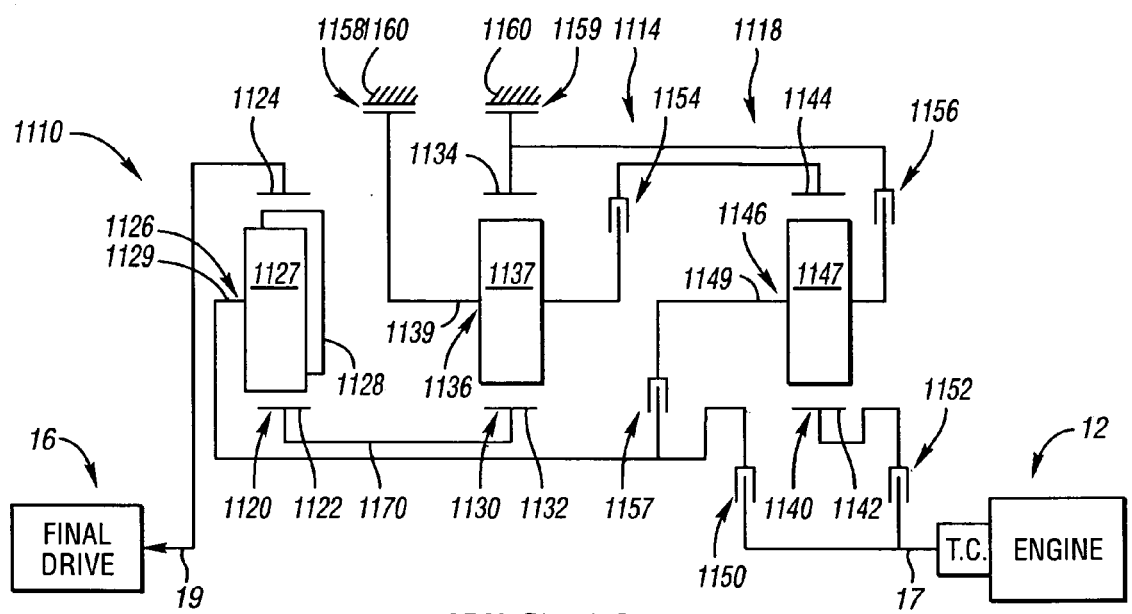

A powertrain 1110, shown in FIG. 12*a*, includes the engine 12, a planetary transmission 1114, and the final drive mechanism 16. The planetary transmission 1114 includes an input shaft 17 continuously connected with the engine 12, a planetary gear arrangement 1118, and an output shaft 19 continuously connected with the final drive mechanism 16. The planetary gear arrangement 1118 includes three planetary gear sets 1120, 1130 and 1140.

The planetary gear set 1120 includes a sun gear member 1122, a ring gear member 1124, and a planet carrier assembly member 1126. The planet carrier assembly member 1126 includes a plurality of pinion gears 1127, 1128 rotatably mounted on a carrier member 1129. The pinion gears 1127 are disposed in meshing relationship with the sun gear member 1122. The pinion gears 1128 are disposed in meshing relationship with the ring gear member 1124 and with the pinion gears 1127.

The planetary gear set 1130 includes a sun gear member 1132, a ring gear member 1134, and a planet carrier assembly member 1136. The planet carrier assembly member 1136 includes a plurality of pinion gears 1137 rotatably mounted on a carrier member 1139 and disposed in meshing relationship with both the sun gear member 1132 and the ring gear member 1134.

The planetary gear set 1140 includes a sun gear member 1142, a ring gear member 1144, and a planet carrier assembly member 1146. The planet carrier assembly member 1146 includes a plurality of pinion gears 1147 rotatably mounted on a carrier member 1149 and disposed in meshing relationship with both the sun gear member 1142 and the ring gear member 1144.

The planetary gear arrangement 1118 also includes seven torque-transmitting mechanisms 1150, 1152, 1154, 1156, 1157, 1158 and 1159. The torque-transmitting mechanisms 1150, 1152, 1154, 1156 and 1157 are rotating type torque-transmitting mechanisms, commonly termed clutches. The torque-transmitting mechanisms 1158 and 1159 are stationary type torque transfer devices commonly termed brakes or reaction clutches.

The input shaft 17 is not continuously connected with any planetary gear member. The output shaft 19 is continuously connected with the ring gear member 1124. The sun gear member 1122 is continuously connected with the sun gear member 1132 through the interconnecting member 1170.

The planet carrier assembly member 1126 is selectively connectable with the input shaft 17 through the input clutch 11150. The sun gear member 1142 is selectively connectable with the input shaft 17 through the input clutch 1152. The planet carrier assembly member 1136 is selectively connectable with the ring gear member 1144 through the clutch 1154. The ring gear member 1134 is selectively connectable with the planet carrier assembly member 1146 through the clutch 1156. The planet carrier assembly member 1126 is selectively connectable with the planet carrier assembly member 1146 through the clutch 1157. The planet carrier assembly member 1136 is selectively connectable with the transmission housing 1160 through the brake 1158. The ring gear member 1134 is selectively connectable with the transmission housing 1160 through the brake 1159.

The truth table shown in FIG. 12*b* describes the engagement combination and the engagement sequence necessary to provide the reverse drive ratio and eight forward speed ratios. A sample of the numerical values for the ratios is also provided in the truth table of FIG. 12*b*. These values are determined utilizing the ring gear/sun gear tooth ratios also given in FIG. 12*b*. The $N_{R1}/N_{S1}$ value is the tooth ratio for the planetary gear set 1120; the $N_{R2}/N_{S2}$ value is the tooth ratio for the planetary gear set 1130; and the $N_{R3}/N_{S3}$ value is the tooth ratio for the planetary gear set 1140. Also given in FIG. 12b is a chart describing the step ratios between the adjacent forward speed ratios and the reverse to first forward speed ratio. For example, the first to second forward speed ratio step is 2.01.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input shaft;
   an output shaft;
   first, second and third planetary gear sets each having first, second and third members;
   said output shaft being continuously interconnected with a member of said planetary gear sets, and said input shaft not being continuously interconnected with any member of said planetary gear sets;
   an interconnecting member continuously interconnecting said first member of said first planetary gear set with said first member of said second planetary gear set or with a stationary member;
   a first torque-transmitting mechanism selectively interconnecting a member of said first, second or third planetary gear set with said input shaft;
   a second torque-transmitting mechanism selectively interconnecting a member of said first, second or third planetary gear set with said input shaft;
   a third torque-transmitting mechanism selectively interconnecting a member of said first planetary gear set with a member of said second or third planetary gear set;
   a fourth torque-transmitting mechanism selectively interconnecting a member of said second planetary gear set with a member of said first or third planetary gear set;
   a fifth torque-transmitting mechanism selectively interconnecting a member of said third planetary gear set with another member of said first or third planetary gear set;
   a sixth torque-transmitting mechanism selectively interconnecting a member of said first or third planetary gear set with another member of said first, second or third planetary gear set or with said stationary member; and
   a seventh torque-transmitting mechanism selectively interconnecting a member of said first, second or third planetary gear set with another member of said first, second or third planetary gear set, or with said stationary member;
   said torque-transmitting mechanisms being engaged in combinations of five to establish at least eight forward speed ratios and at least one reverse speed ratio between said input shaft and said output shaft.

2. The transmission defined in claim 1, wherein said first, second, third, fourth and fifth torque-transmitting mechanisms comprise clutches, and said sixth and seventh torque-transmitting mechanisms comprise brakes.

3. The transmission defined in claim 1, wherein said first, second, third, fourth, fifth and sixth torque-transmitting mechanisms comprise clutches, and said seventh torque-transmitting mechanisms comprise a brake.

4. The transmission defined in claim 1, wherein said first, second, third, fourth, fifth, sixth and seventh torque-transmitting mechanisms comprise clutches.

5. The transmission defined in claim 1, wherein planet carrier assembly members of each of said planetary gear sets are single-pinion carriers.

6. The transmission defined in claim 1, wherein at least one planet carrier assembly member of said planetary gear sets is a double-pinion carrier.

7. The transmission defined in claim 1, wherein said first, second and third members comprise a ring gear member, sun gear member, and planet carrier assembly member, in any order.

8. A multi-speed transmission comprising:
   an input shaft;
   an output shaft;
   a planetary gear arrangement having first, second and third planetary gear sets, each planetary gear set having first, second and third members;
   said output shaft being continuously interconnected with a member of said planetary gear sets, and said input shaft not being continuously interconnected with any member of said planetary gear sets;
   an interconnecting member continuously interconnecting said first member of said first planetary gear set with said first member of said second planetary gear set or with a stationary member; and
   seven torque-transmitting mechanisms for selectively interconnecting said members of said planetary gear sets with said input shaft, with a stationary member or with other members of said planetary gear sets, said seven torque-transmitting mechanisms being engaged in combinations of five to establish at least eight forward speed ratios and at least one reverse speed ratio between said input shaft and said output shaft.

9. The transmission defined in claim 8, wherein a first of said seven torque-transmitting mechanisms is operable for selectively interconnecting a member of said first, second or third planetary gear set with said input shaft.

10. The transmission defined in claim 8, wherein a second of said seven torque-transmitting mechanisms is operable for selectively interconnecting a member of said first, second or third planetary gear set with said input shaft.

11. The transmission defined in claim 8, wherein a third of said seven torque-transmitting mechanisms is selectively operable for interconnecting a member of said first planetary gear set with a member of said second or third planetary gear set.

12. The transmission defined in claim 8, wherein a fourth of said seven torque-transmitting mechanisms is selectively operable for interconnecting a member of said second planetary gear set with a member of said first or third planetary gear set.

13. The transmission defined in claim 8, wherein a fifth of said seven torque-transmitting mechanisms is selectively operable for interconnecting a member of said third planetary gear set with another member of said first or third planetary gear set.

14. The transmission defined in claim 8, wherein a sixth of said seven torque-transmitting mechanisms selectively interconnects a member of said first or third planetary gear set with another member of said first, second or third planetary gear set or with said stationary member.

15. The transmission defined in claim 8, wherein a seventh of said seven torque-transmitting mechanisms selectively interconnects a member of said first, second or third planetary gear set with another member of said first, second or third planetary gear set, or with said stationary member.

16. The transmission defined in claim 8, wherein planet carrier assembly members of each of said planetary gear sets are single-pinion carriers.

17. The transmission defined in claim 8, wherein at least one planet carrier assembly member of said planetary gear sets is a double-pinion carrier.

18. The transmission defined in claim 8, wherein said first, second and third members comprise a ring gear member, sun gear member, and planet carrier assembly member, in any order.

* * * * *